United States Patent
Lovell et al.

(10) Patent No.: US 11,709,911 B2
(45) Date of Patent: Jul. 25, 2023

(54) ENERGY-EFFICIENT MEMORY SYSTEMS AND METHODS

(71) Applicant: Maxim Integrated Products, Inc., San Jose, CA (US)

(72) Inventors: Mark Alan Lovell, Lucas, TX (US); Robert Michael Muchsel, Addison, TX (US)

(73) Assignee: Maxim Integrated Products, Inc., San Jose, CA (US)

(*) Notice: Subject to any disclaimer, the term of this patent is extended or adjusted under 35 U.S.C. 154(b) by 895 days.

(21) Appl. No.: 16/590,258

(22) Filed: Oct. 1, 2019

(65) Prior Publication Data

US 2020/0110604 A1 Apr. 9, 2020

Related U.S. Application Data

(60) Provisional application No. 62/740,679, filed on Oct. 3, 2018.

(51) Int. Cl.
*G06F 17/15* (2006.01)
(52) U.S. Cl.
CPC .................. *G06F 17/153* (2013.01)
(58) Field of Classification Search
CPC .... G06F 17/153; G06F 3/0607; G06F 3/0638; G06F 3/0646; G06F 3/0655; G06F 3/0656; G06F 7/76; G06F 7/78; G06F 12/0207; G06N 3/0454; G06N 3/063
See application file for complete search history.

(56) References Cited

U.S. PATENT DOCUMENTS

2018/0300138 A1* 10/2018 Pineda de Gyvez . G06F 9/3001
2019/0179870 A1* 6/2019 Bannon ............... G06F 12/0875

OTHER PUBLICATIONS

W. Xu, Z. Wang, X. You and C. Zhang, "Efficient fast convolution architectures for convolutional neural network," 2017 IEEE 12th International Conference on ASIC (ASICON), 2017, pp. 904-907, doi: 10.1109/ASICON.2017.8252623. (Year: 2017).*

* cited by examiner

*Primary Examiner* — Matthew D Sandifer
*Assistant Examiner* — Huy Duong
(74) *Attorney, Agent, or Firm* — North Weber & Baugh LLP; Michael North

(57) ABSTRACT

Described herein are systems and methods that increase the utilization and performance of computational resources, such as storage space and computation time, thereby, reducing computational cost. Various embodiments of the invention provide for a hardware structure that allows both streaming of source data that eliminates redundant data transfer and allows for in-memory computations that eliminate requirements for data transfer to and from intermediate storage. In certain embodiments, computational cost is reduced by using a hardware structure that enables mathematical operations, such as element-wise matrix multiplications employed by convolutional neural networks, to be performed automatically and efficiently.

13 Claims, 22 Drawing Sheets

700

END OF ROW

| 0 | 0 | 0 | 0 | 0 | 0 | 0 | 0 | 0 | 0 |
|---|---|---|---|---|---|---|---|---|---|
| 0.0 | 0.1 | 0.2 | 0.3 | 0.4 | 0.5 | 0.6 | 0.7 | 0 | 0 |
| 0 | 0 | 0 | 0 | 0 | 0 | 0 | 0 | 0 | 0 |

DISCARD →

LOAD ZEROS ↑

←ROTATE

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0.0 | 0.1 | 0.2 | 0.3 | 0.4 | 0.5 | 0.6 | 0.7 |
| 0 | 0 | 1.0 | 1.1 | 1.2 | 1.3 | 1.4 | 1.5 | 1.6 | 1.7 |
| 0 | 0 | 2.0 | 2.1 | 2.2 | 2.3 | 2.4 | 2.5 | 2.6 | 2.7 |
| 0 | 0 | 3.0 | 3.1 | 3.2 | 3.3 | 3.4 | 3.5 | 3.6 | 3.7 |
| 0 | 0 | 4.0 | 4.1 | 4.2 | 4.3 | 4.4 | 4.5 | 4.6 | 4.7 |
| 0 | 0 | 5.0 | 5.1 | 5.2 | 5.3 | 5.4 | 5.5 | 5.6 | 5.7 |
| 0 | 0 | 6.0 | 6.1 | 6.2 | 6.3 | 6.4 | 6.5 | 6.6 | 6.7 |
| 0 | 0 | 7.0 | 7.1 | 7.2 | 7.3 | 7.4 | 7.5 | 7.6 | 7.7 |

←ROTATE

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0.0 | 0.1 | 0.2 | 0.3 | 0.4 | 0.5 | 0.6 | 0.7 | 0 |
| 0 | 1.0 | 1.1 | 1.2 | 1.3 | 1.4 | 1.5 | 1.6 | 1.7 | 0 |
| 0 | 2.0 | 2.1 | 2.2 | 2.3 | 2.4 | 2.5 | 2.6 | 2.7 | 0 |
| 0 | 3.0 | 3.1 | 3.2 | 3.3 | 3.4 | 3.5 | 3.6 | 3.7 | 0 |
| 0 | 4.0 | 4.1 | 4.2 | 4.3 | 4.4 | 4.5 | 4.6 | 4.7 | 0 |
| 0 | 5.0 | 5.1 | 5.2 | 5.3 | 5.4 | 5.5 | 5.6 | 5.7 | 0 |
| 0 | 6.0 | 6.1 | 6.2 | 6.3 | 6.4 | 6.5 | 6.6 | 6.7 | 0 |
| 0 | 7.0 | 7.1 | 7.2 | 7.3 | 7.4 | 7.5 | 7.6 | 7.7 | 0 |

←ROTATE

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0.0 | 0.1 | 0.2 | 0.3 | 0.4 | 0.5 | 0.6 | 0.7 | 0 | 0 |
| 1.0 | 1.1 | 1.2 | 1.3 | 1.4 | 1.5 | 1.6 | 1.7 | 0 | 0 |
| 2.0 | 2.1 | 2.2 | 2.3 | 2.4 | 2.5 | 2.6 | 2.7 | 0 | 0 |
| 3.0 | 3.1 | 3.2 | 3.3 | 3.4 | 3.5 | 3.6 | 3.7 | 0 | 0 |
| 4.0 | 4.1 | 4.2 | 4.3 | 4.4 | 4.5 | 4.6 | 4.7 | 0 | 0 |
| 5.0 | 5.1 | 5.2 | 5.3 | 5.4 | 5.5 | 5.6 | 5.7 | 0 | 0 |
| 6.0 | 6.1 | 6.2 | 6.3 | 6.4 | 6.5 | 6.6 | 6.7 | 0 | 0 |
| 7.0 | 7.1 | 7.2 | 7.3 | 7.4 | 7.5 | 7.6 | 7.7 | 0 | 0 |

←ROTATE

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0.1 | 0.2 | 0.3 | 0.4 | 0.5 | 0.6 | 0.7 | 0 | 0 | 0.0 |
| 1.1 | 1.2 | 1.3 | 1.4 | 1.5 | 1.6 | 1.7 | 0 | 0 | 1.0 |
| 2.1 | 2.2 | 2.3 | 2.4 | 2.5 | 2.6 | 2.7 | 0 | 0 | 2.0 |
| 3.1 | 3.2 | 3.3 | 3.4 | 3.5 | 3.6 | 3.7 | 0 | 0 | 3.0 |
| 4.1 | 4.2 | 4.3 | 4.4 | 4.5 | 4.6 | 4.7 | 0 | 0 | 4.0 |
| 5.1 | 5.2 | 5.3 | 5.4 | 5.5 | 5.6 | 5.7 | 0 | 0 | 5.0 |
| 6.1 | 6.2 | 6.3 | 6.4 | 6.5 | 6.6 | 6.7 | 0 | 0 | 6.0 |
| 7.1 | 7.2 | 7.3 | 7.4 | 7.5 | 7.6 | 7.7 | 0 | 0 | 7.0 |

←ROTATE

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0.2 | 0.3 | 0.4 | 0.5 | 0.6 | 0.7 | 0 | 0 | 0.0 | 0.1 |
| 1.2 | 1.3 | 1.4 | 1.5 | 1.6 | 1.7 | 0 | 0 | 1.0 | 1.1 |
| 2.2 | 2.3 | 2.4 | 2.5 | 2.6 | 2.7 | 0 | 0 | 2.0 | 2.1 |
| 3.2 | 3.3 | 3.4 | 3.5 | 3.6 | 3.7 | 0 | 0 | 3.0 | 3.1 |
| 4.2 | 4.3 | 4.4 | 4.5 | 4.6 | 4.7 | 0 | 0 | 4.0 | 4.1 |
| 5.2 | 5.3 | 5.4 | 5.5 | 5.6 | 5.7 | 0 | 0 | 5.0 | 5.1 |
| 6.2 | 6.3 | 6.4 | 6.5 | 6.6 | 6.7 | 0 | 0 | 6.0 | 6.1 |
| 7.2 | 7.3 | 7.4 | 7.5 | 7.6 | 7.7 | 0 | 0 | 7.0 | 7.1 |

←ROTATE

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0.3 | 0.4 | 0.5 | 0.6 | 0.7 | 0 | 0 | 0.0 | 0.1 | 0.2 |
| 1.3 | 1.4 | 1.5 | 1.6 | 1.7 | 0 | 0 | 1.0 | 1.1 | 1.2 |
| 2.3 | 2.4 | 2.5 | 2.6 | 2.7 | 0 | 0 | 2.0 | 2.1 | 2.2 |
| 3.3 | 3.4 | 3.5 | 3.6 | 3.7 | 0 | 0 | 3.0 | 3.1 | 3.2 |
| 4.3 | 4.4 | 4.5 | 4.6 | 4.7 | 0 | 0 | 4.0 | 4.1 | 4.2 |
| 5.3 | 5.4 | 5.5 | 5.6 | 5.7 | 0 | 0 | 5.0 | 5.1 | 5.2 |
| 6.3 | 6.4 | 6.5 | 6.6 | 6.7 | 0 | 0 | 6.0 | 6.1 | 6.2 |
| 7.3 | 7.4 | 7.5 | 7.6 | 7.7 | 0 | 0 | 7.0 | 7.1 | 7.2 |

FIG. 11

ENERGY-EFFICIENT MEMORY SYSTEMS AND METHODS

CROSS-REFERENCE TO RELATED APPLICATIONS

The present application claims priority benefit, under 35 U.S.C. § 119(e), to and commonly-assigned U.S. provisional patent application Ser. No. 62/740,679, entitled "Energy-Efficient Tornado Memory Systems and Methods," naming as inventors Mark Alan Lovell and Robert Michael Muchsel, and filed Oct. 3, 2018, which application is herein incorporated by reference as to its entire content. Each reference mentioned in this patent document is incorporated by reference herein in its entirety.

BACKGROUND

A. Technical Field

The present disclosure relates generally to data processing. More particularly, the present disclosure relates to systems and methods for improving utilization of computing and memory resources when performing arithmetic operations, such as convolutions and pooling operations.

B. Background

Some of the most exciting applications of machine learning use Convolutional Neural Networks (CNNs). CNNs apply a number of hierarchical network layers and sub-layers to, for example, an input image to determine whether to categorize an image as containing a person or some other object. CNNs use neural network-based image classifiers that can automatically learn complex features for classification and object recognition tasks. Arithmetic operations for convolutions are typically performed in software that operates on a general-purpose computing device, such as a conventional microprocessor. This approach is very costly in terms of both power and time, and for many computationally intensive applications (e.g., real-time applications) general hardware is unable to perform the necessary operations in a timely manner as the rate of calculations is limited by the computational resources and capabilities of existing hardware designs.

Further, using a general processor's arithmetic functions to generate intermediate results comes at the expense of computing time due to the added steps of storing and retrieving intermediate results from various memory locations to complete an operation. For example, many conventional multipliers are scalar machines that use a CPU or GPU as their computation unit and use registers and a cache to process data stored in memory relying on a series of software and hardware matrix manipulation steps, such as address generation, transpositions, bit-by-bit addition and shifting, converting multiplications into additions and outputting the result into some internal register.

Furthermore, computationally demanding applications such convolutions oftentimes require a software function be embedded in the microprocessor and be used to convert convolution operations into alternate matrix-multiply operations. This involves rearranging and reformatting image data and weight data into two matrices that then are raw matrix-multiplied. There exist no mechanisms that efficiently select, use, and reuse data, while avoiding to generate redundant data and avoiding to access data redundantly. Software must access the same locations of a standard memory and read, re-fetch, and write the same data over and over again when performing multiplication and other operations, which is computationally very burdensome and creates a bottleneck that curbs the boom for machine learning applications. As the amount of data subject to convolution operations increases and the complexity of operations continues to grow, the inability to reuse much of the data coupled with the added steps of storing and retrieving intermediate results from memory to complete an arithmetic operation present only some of the shortcoming of existing designs.

In short, conventional hardware and methods are not well-suited for the ever-increasing demands for speed, performance, and energy conservation that are required to perform a myriad of complex processing steps involving large amounts of data in real-time. Accordingly, what is needed are high-computational-throughput systems and methods that drastically reduce the number of operations and move data in a rapid and energy-efficient manner when performing arithmetic operations.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

FIG. 7 illustrates discarding data by a cache and compute structure according to various embodiments of the present disclosure.

FIG. 11 illustrates data shifting and rotation by a cache and compute structure on a padded memory, according to various embodiments of the present disclosure.

DETAILED DESCRIPTION OF EMBODIMENTS

Figure 1:
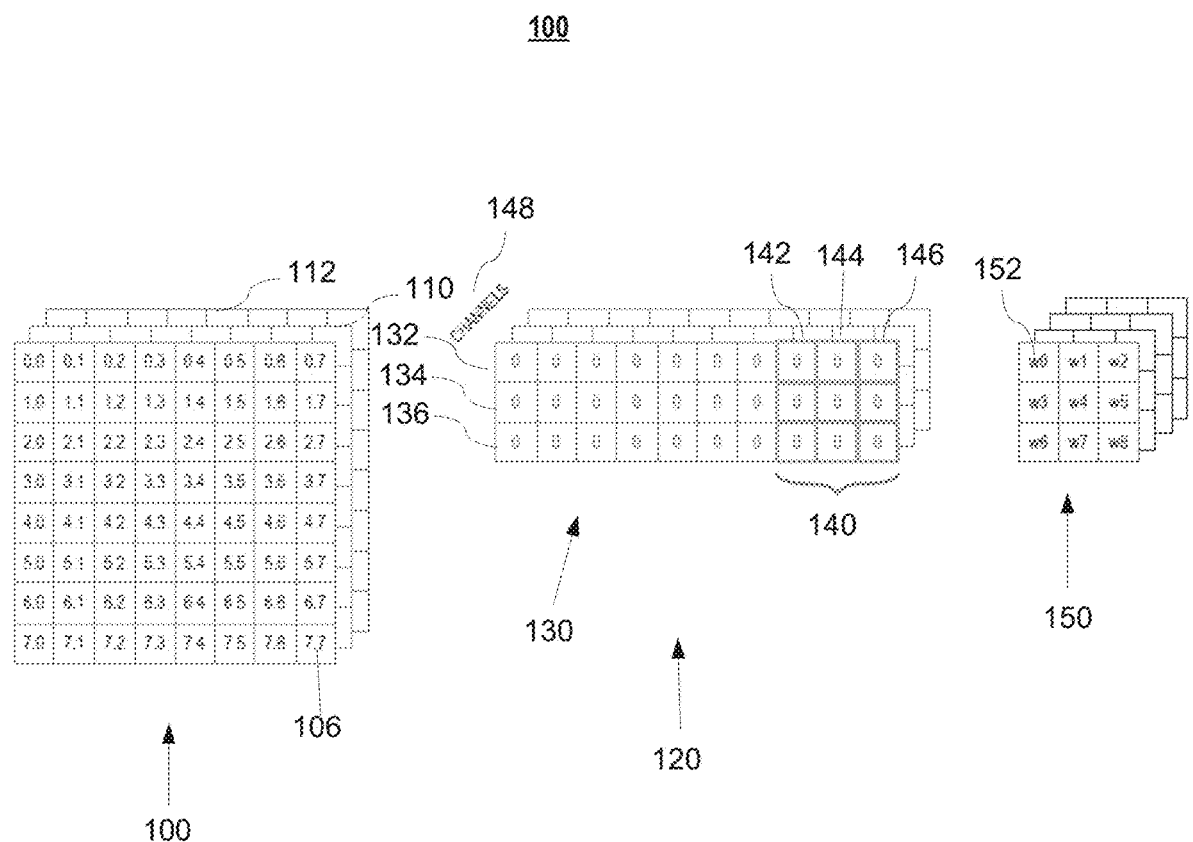
FIG. 1 illustrates an exemplary cache and compute structure according to various embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, it shall be noted that embodiments described herein are given in the context of CNNs, but one skilled in the art shall recognize that the teachings of the present disclosure are not limited to CNNs and may be applied to various other networks and applications that involve arithmetic operations that may be used in other contexts. For example, although embodiments herein are discussed mainly in the context of convolutions, one of skill in the art will appreciate that a deconvolution operation can also be structured as matrix-matrix type multiply operation and, thus, the principles of the present invention are equally applicable to deconvolutions. Furthermore, other types of mathematical operations may be implemented in accordance with various embodiments of this disclosure.

In this document the terms "memory" "cache and compute structure," "caching and compute structure," "compute cache," "cache structure," and "compute structure" are used interchangeably. Similarly, the terms "kernel" and "weights" are used interchangeably.

FIG. 1 illustrates an exemplary cache and compute structure according to various embodiments of the present disclosure for use in a convolutional neural network calculation. As depicted in FIG. 1, a system comprising memory 120 may further comprise memory 100 (e.g., any common memory) and kernel 150. Memory 120 may comprise cache section 130, which may serve as intermediate storage, and compute section 140. In embodiments, cache and compute structure 120 may be implemented as a register-based hardware structure. However, cache and compute structure 120 illustrated in FIG. 1 is not limited to the constructional detail shown there or described in the accompanying text. As those skilled in the art will appreciate, suitable implementation-specific modifications may be made, e.g., to adjust for the dimensions and shapes of memories 100, 120, and 150. It is understood that cache section 130 may be implemented separately from compute section 140. The relatively small and square image and kernel size, their aspect ratios, and their orientations have been chosen for convenience of illustration and are not intended as a limitation on the scope of the present disclosure.

In operation, memory 100 may serve to store source data, e.g., input image data, video data, audio data, etc., arranged in a matrix format that has a certain height and a width. While simplified illustrations herein show and describe a single input channel, a person of skill in the art will appreciate that any number of input channels may be processed in parallel to generate output channels.

Figure 2:
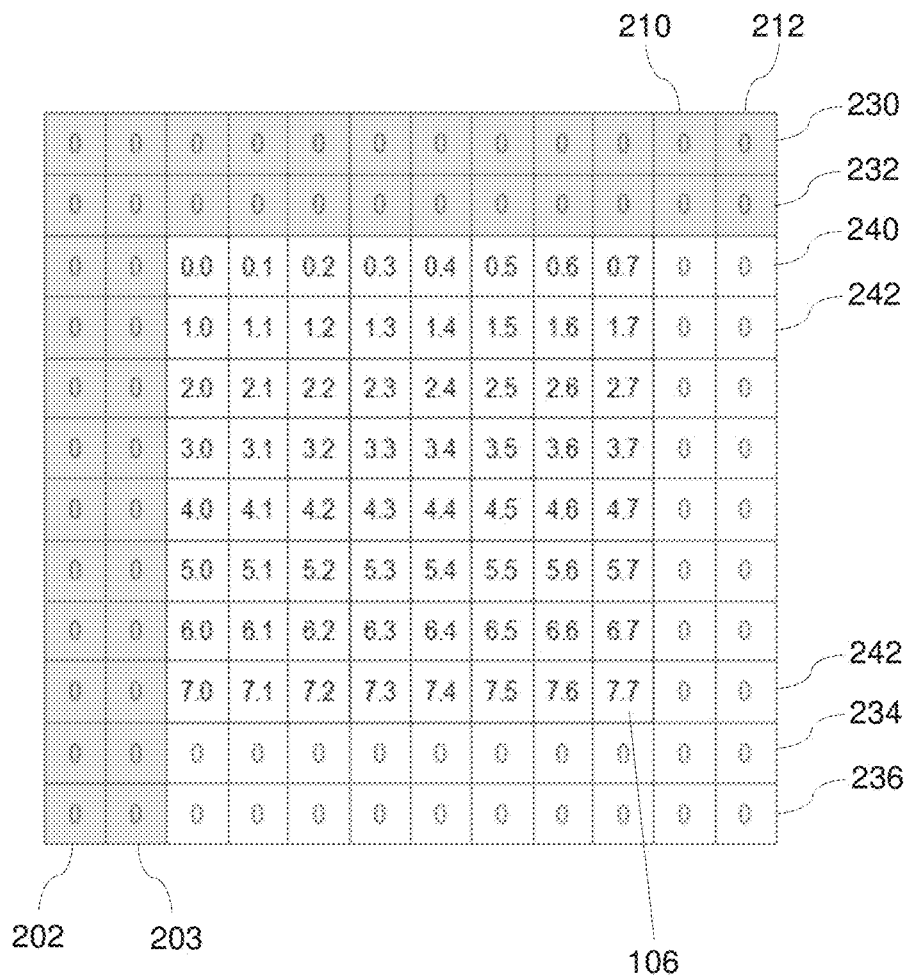
FIG. 2 shows padding as applied to a common image file stored in a memory device.

The dimensions of cache and compute structure 120 may be designed such that, in embodiments, its minimum width is equal to the width of memory 100 holding the image data (without padding) plus any width that may account for columns of padding 144, 146, as discussed in greater detail with respect to FIG. 2. As a result, caching and compute structure 120 may be dimensioned based on a set of other memory, such as comprising memory 100 and kernel 150.

In embodiments, the concepts presented in this document may be applied to a full-size memory, thus, eliminating the need to separate cache structure 130 from compute structure 140. In embodiments, filter or kernel 150 holds individual weights 152 that may be used in a computation, here, a convolution. Any number of kernels 150 may be used by a convolution layer to apply a set of weights 152 to data in a convolution window of an image. In embodiments, weights 152 may have been learned by a CNN during a training phase, e.g., to generate an activation value associated with the convolution window. For each kernel 150, the convolution layer may have, for each data point, one network node, i.e., neuron, that outputs an activation value that may be calculated based on the set of weights 152. The activation value for the convolution window may identify a feature or a characteristic, such as an edge that then may be used to identify the same feature at other locations within the image. In embodiments, weights 152 in kernel 150 are applied to elements in compute section 140. The data in compute section 140 may be used, e.g., in each cycle of a convolution operation, as will be discussed in greater detail with reference to FIG. 15.

It is understood that embodiments presented herein may process data by taking advantage of any existing symmetry. It is further understood that source data 100 may be used (e.g., simultaneously) by two or more networks; it may also be used by a network that performs parallel processes. It is further understood that embodiments disclosed herein may comprise any number of additional circuits and sub-circuits, such as logic circuitry and/or control circuits, caches, local buffers, comparators, state machines, post processing units, and auxiliary devices that perform management functions to aid the goals of the present disclosure.

The mathematical concepts underlying convolutional neural networks are well-known in the art. In brief, a set of filters in the form of a limited-size kernel or weight data is applied to a set of larger input channel data (e.g., passed across an area of an image) or image data to produce output channel data (e.g., an output matrix) for a particular layer of the CNN. Each element in each output channel represents the sum of the products of the individual weights in the kernel multiplied by the individual data values of the input channels, passed through a nonlinear activation function, such as a ReLU or Sigmoid function. In many cases, the source/input channel data is zero-padded as shown in FIG. 2.

FIG. 2 shows padding as applied to a common image file stored in a memory device. As depicted, columns 202, 203, 210, 212 and rows 230-236 may be arrays of data located at the edges of matrix 200 to fulfill a padding function, here, zero-padding. In practice, padding may be performed prior to a convolution layer operation, e.g., to generate a predetermined output feature map size. In embodiments, padding may also be enabled in response to a stride (i.e., interval or step size) being set to a value greater than 1.

In embodiments, padding data is not physically stored but, instead, a control logic (not shown) may, at the appropriate times, load zero-bytes into columns 202, 203, 210, 212, and rows 230-236, for example, to adjust the divisor in an average pooling operation to equal the sum of the non-zero pooling values involved in an averaging calculation.

In embodiments, a data structure that uses rotation operations may ignore some of the padding elements. For example, in FIG. 2 half of the rows and columns, i.e., rows 230, 232 and columns 202, 203 remain unused but are shown with a shaded background. It is understood that embodiments disclosed herein may operate with and without padding. For clarity purposes, only scenarios with padding are illustrated herein.

Figure 3:
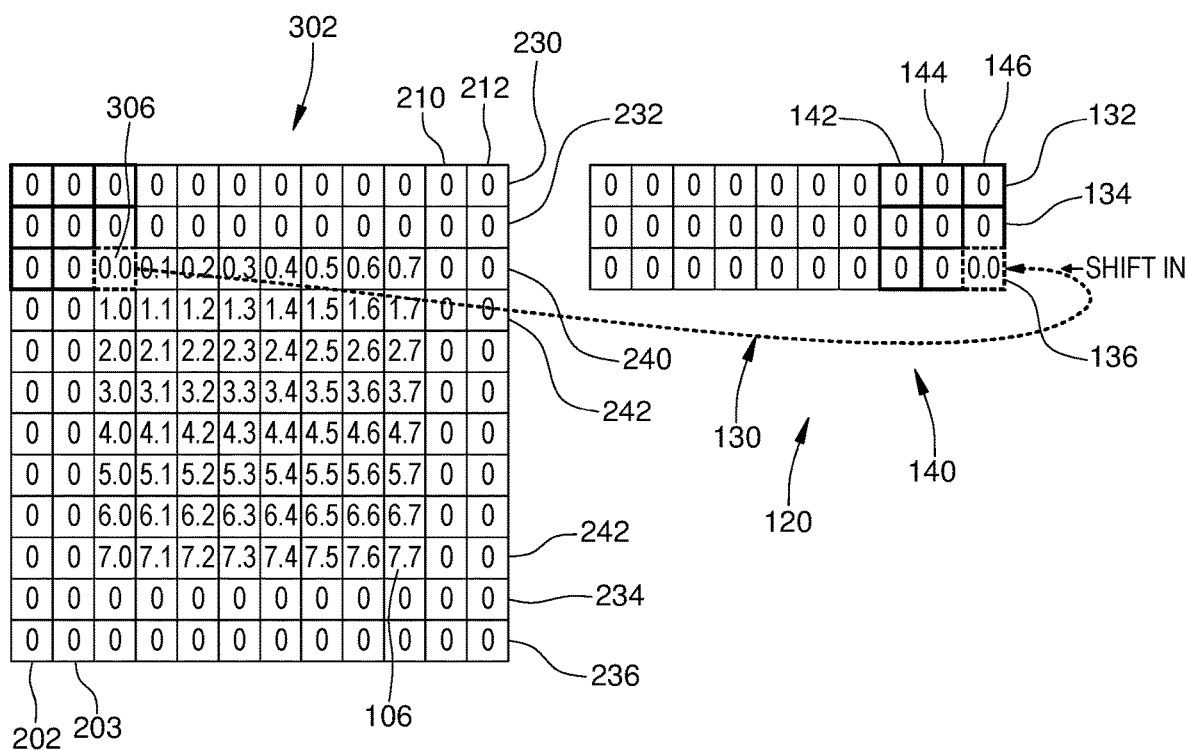
FIG. 3 illustrates a read operation that reads data from a source memory into an exemplary cache and compute structure according to various embodiments of the present disclosure.

FIG. 3 illustrates a read operation that reads data from a source memory into an exemplary cache and compute structure according to various embodiments of the present disclosure. In a manner similar to FIG. 2, source data 300 in FIG. 3 is padded by loading zero-byte data into columns 202, 203, 210, 212, and rows 230-236 and by using only half of the rows and columns, i.e., rows 234, 236 and columns 210, 212. And similar to FIG. 1, memory 120 comprises caching structure 130 and compute structure 140.

In operation, caching and compute structure 120 may be initialized with zeros. As depicted, a first data item 306 having a value, here 0.0, is read into column 146 of compute structure 140. In embodiments, for each data item 106, the following sequence of steps may be performed for all input channels (not shown in FIG. 3): Once a full row rotation has been performed, all elements may be shifted up by one row, such that row 132 at the top of caching and compute structure 120 may be discarded, and a new row comprising zeros may be loaded, e.g., from the bottom of caching and compute structure 120, to replace bottom row 136.

Figure 4:
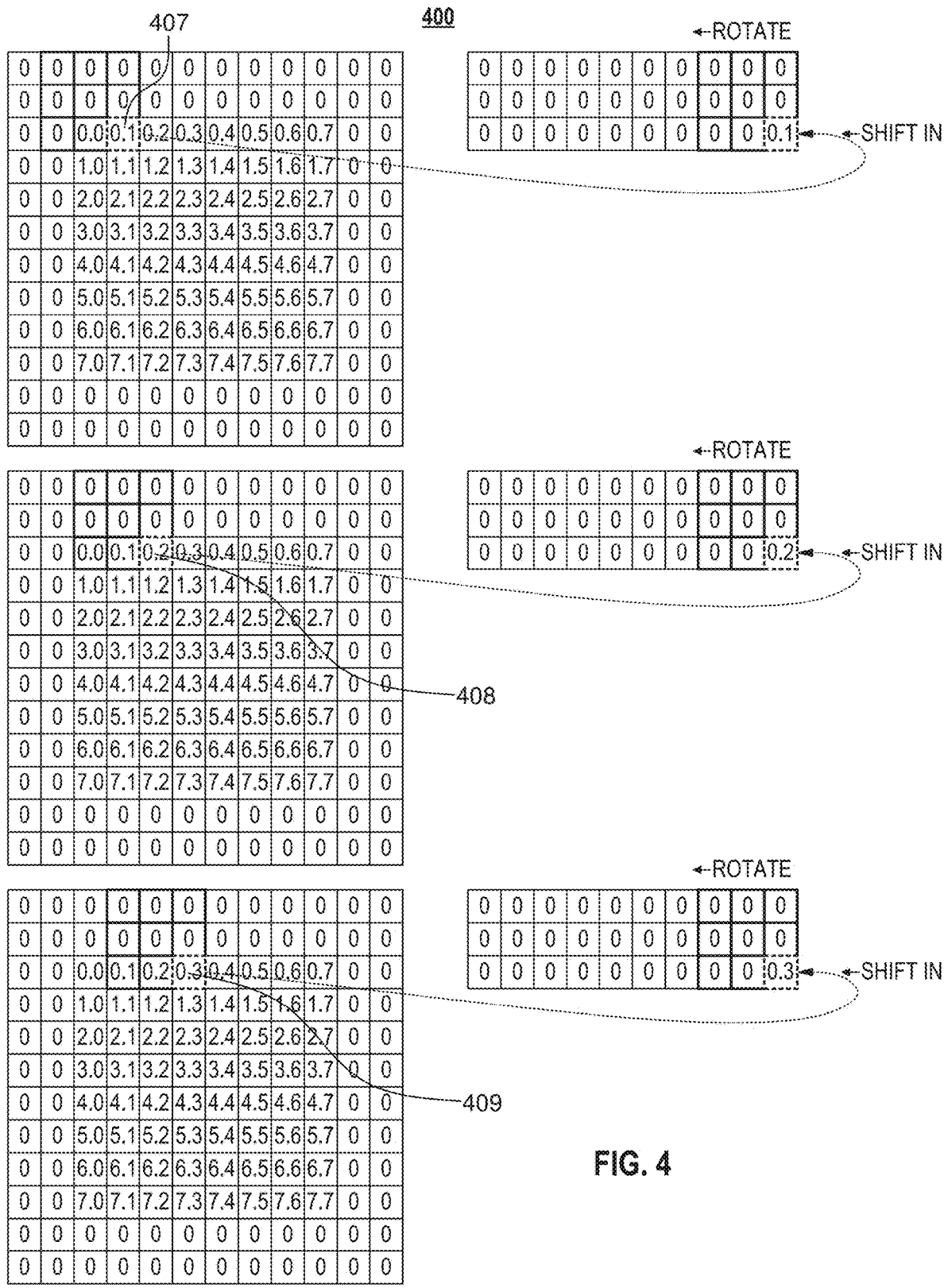
FIG. 4-FIG. 6 illustrate data shifting and rotation by a cache and compute structure prior to discarding data, according to various embodiments of the present disclosure.
Figure 5:
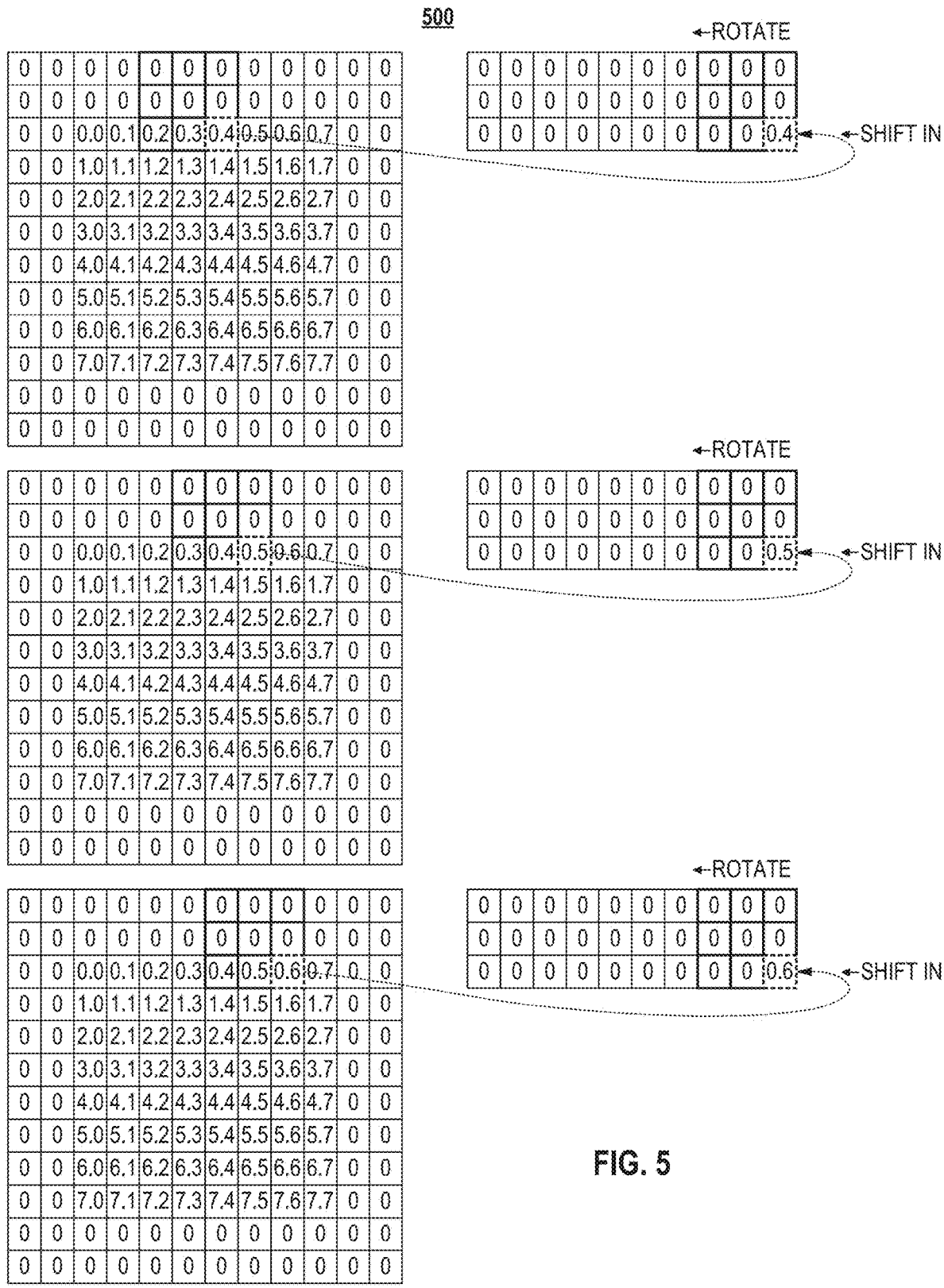
Figure 6:
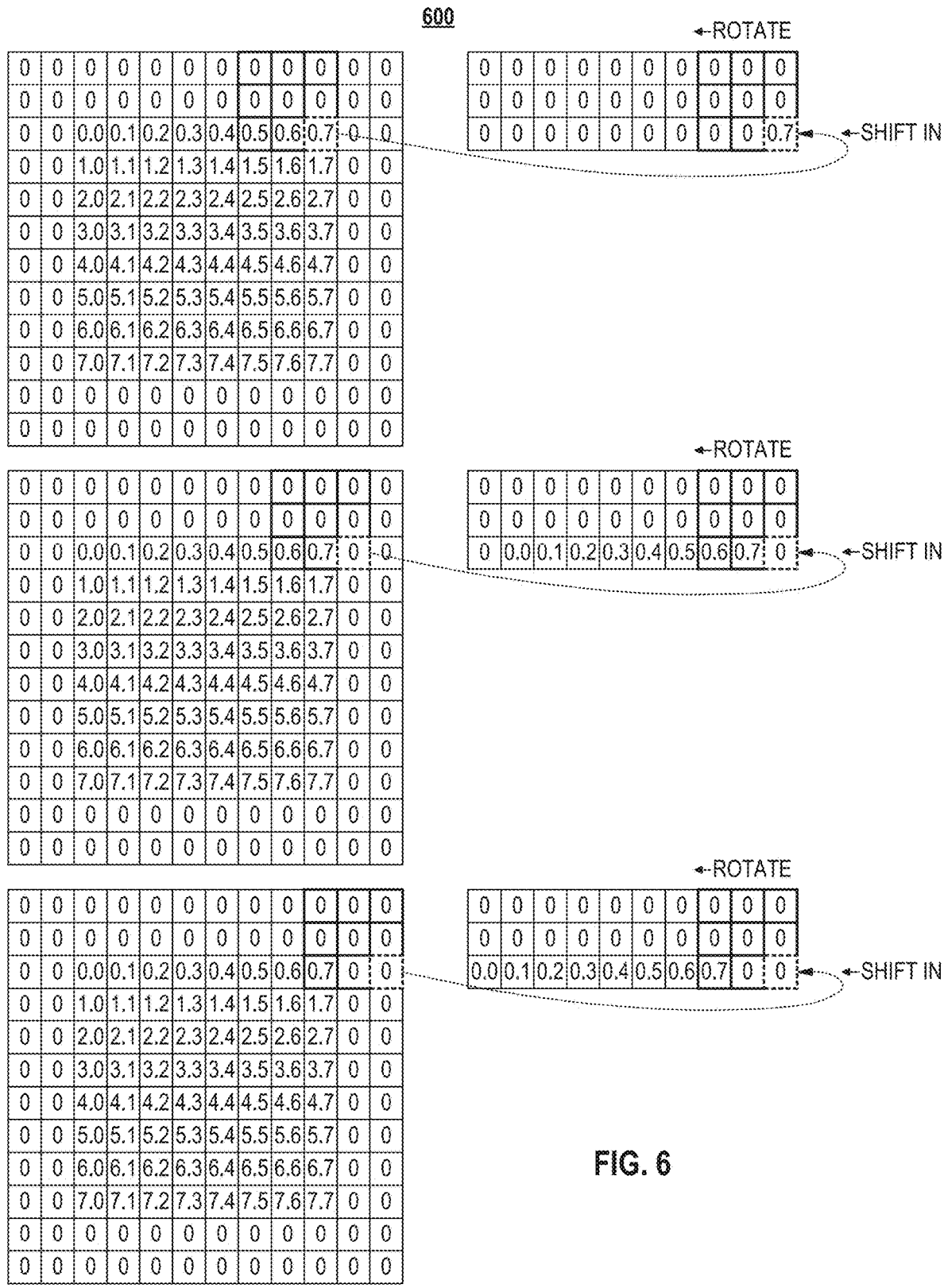

Then, the contents of memory 120 may be rotated left by one element, such that the bottom right element is replaced by the previously read first data item 306, such that one or more mathematical operations may be performed on compute structure 140 and the next data item 407 may be read, and so on, as shown in FIG. 4 through FIG. 6, which illustrate data shifting and rotation by memory 120, according to various embodiments of the present disclosure. It is understood that shifting or pulling operations may be performed by a state machine (not shown) that may perform any number of additional operations, e.g., prior to sending data a post-processing unit (also not shown). Additionally, as will be apparent to one skilled in the art, embodiments may use pointers to memory elements to avoid physically moving memory yet still logically achieve rotation.

Once the data items, including any padding that has not been ignored, in row 240 have been read and processed, row 132 in memory 120 may be discarded and a new row, e.g., comprising zeros, may be loaded from the bottom of memory 120, as shown in FIG. 7. In embodiments, the process may continue as shown in FIG. 8 through FIG. 9, which illustrate data shifting and rotation by memory 120 after a row has been discarded.

Figure 8:
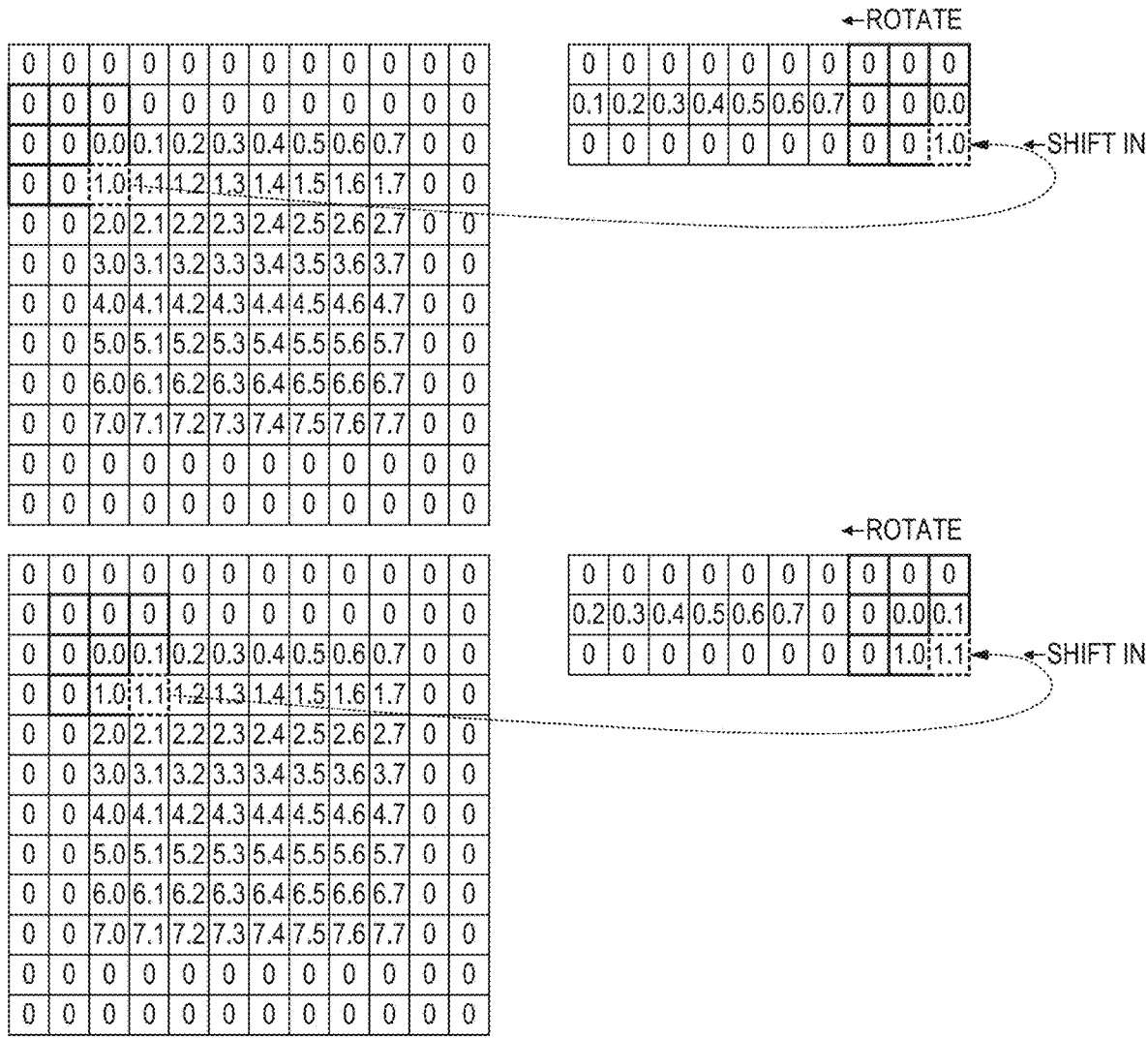
FIG. 8-FIG. 9 illustrate data shifting and rotation by a cache and compute structure after discarding data, according to various embodiments of the present disclosure.
Figure 9:
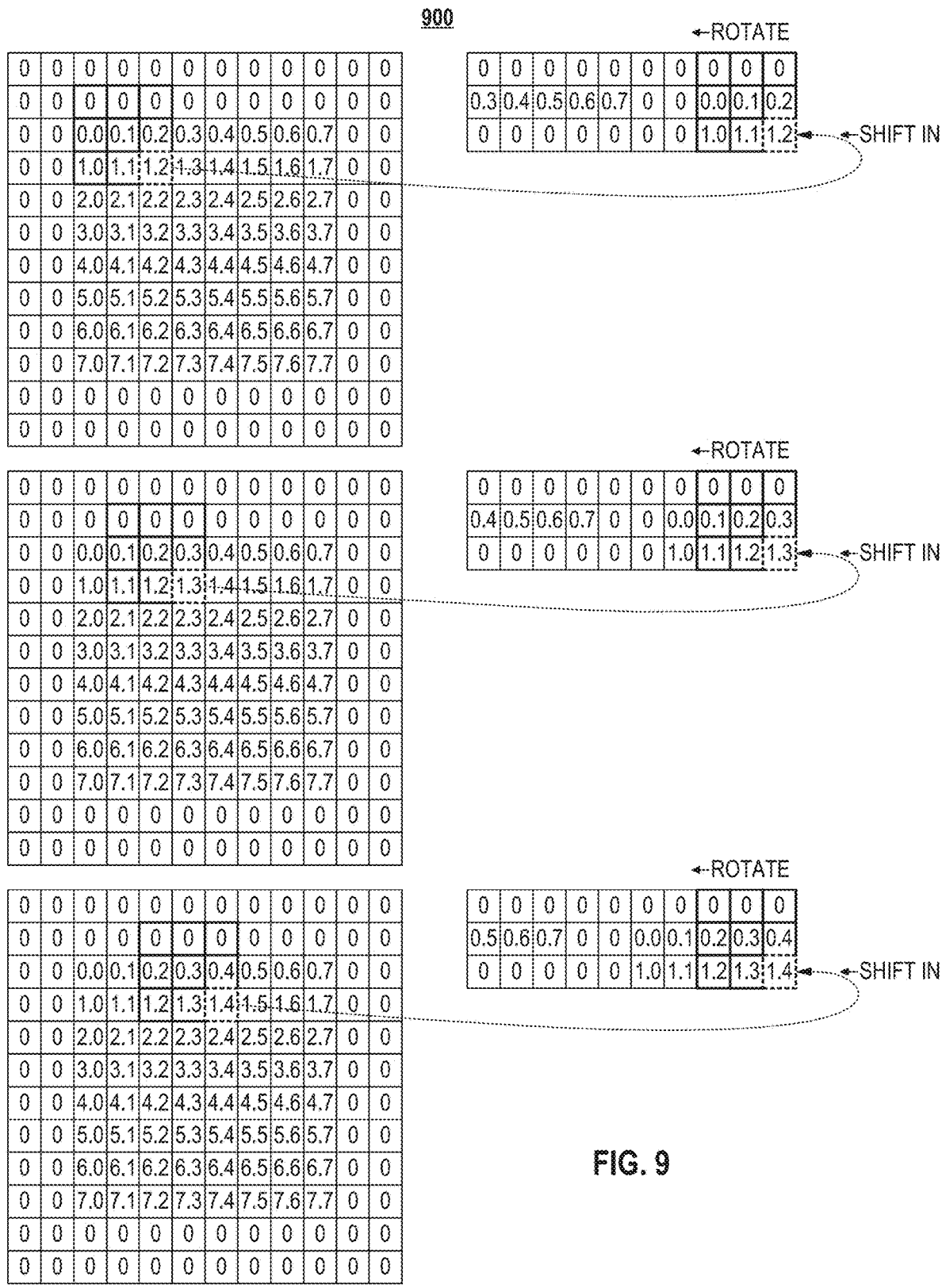

In embodiments, once source data is loaded from memory 100 into memory 120, memory 120 may perform the ordered sequence of rotating and shifting operations shown in FIG. 8 through FIG. 9 to allow compute section 140 to use the loaded data many times, i.e., over many cycles, to ultimately obtain an arithmetic result without having to reload the same source data numerous times. In embodiments, the sequence of rotating and shifting operations may be controlled by a state machine that does not rely on an external control device, such as a CPU.

As a result, the systems and methods for memory 120 allow for efficient reuse of once loaded data over for a number of operations without having to re-fetch or reload the data over and over again from addresses in the standard memory. This advantageously avoids re-duplication of read operations and the need to perform computationally expensive data movement operations.

Figure 10:
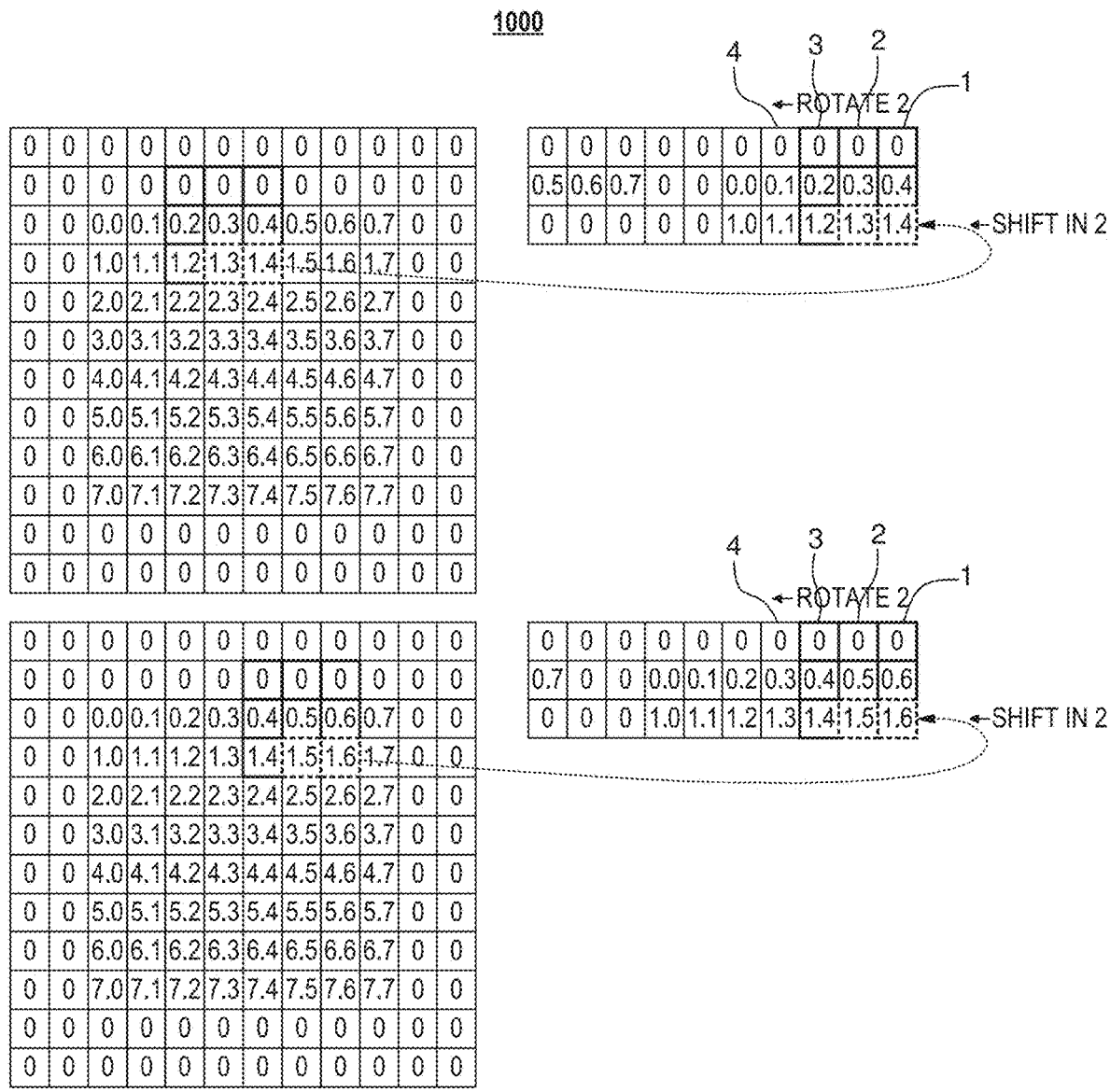
FIG. 10 illustrates the use of stride by a cache and compute structure according to various embodiments of the present disclosure.

Embodiments disclosed herein support various hyperparameters such as stride. When the width of the stride is greater than one, rotation and shift operations may be performed as shown in FIG. 10, which illustrates the use of stride by a cache and compute structure according to various embodiments of the present disclosure. In embodiments, for each increase in stride value by one, one additional data column may be shifted in to rotate the columns by one.

The example in FIG. 10 illustrates a stride of two. As can be easily observed, values 1.3 and 1.4 in columns 2 and 1 are rotated to the left by two, such that after application of a stride having the value two, the values 1.3 and 1.4 will be rotated in a manner such that they occupy positions in respectively columns 4 and 3. It is understood that the width, height, and padding of source data 100 and memory 120 may depend on kernel size, stride, and other convolution parameters.

The diagrams shown above depict hierarchical (or caching) systems that may be implemented with common memory 100 as a source or may be streamed directly, e.g., from a sensor. In embodiments, data shifting and rotation capabilities may be implemented directly within larger memory 1100, as illustrated in FIG. 11. In embodiments, memory 1100 is sufficiently large such that data need not be discarded. Instead, data may be continuously rotated along the height dimension of memory 1100, such that the original pre-rotation data is restored once a certain number of operations has been completed.

Figure 12:
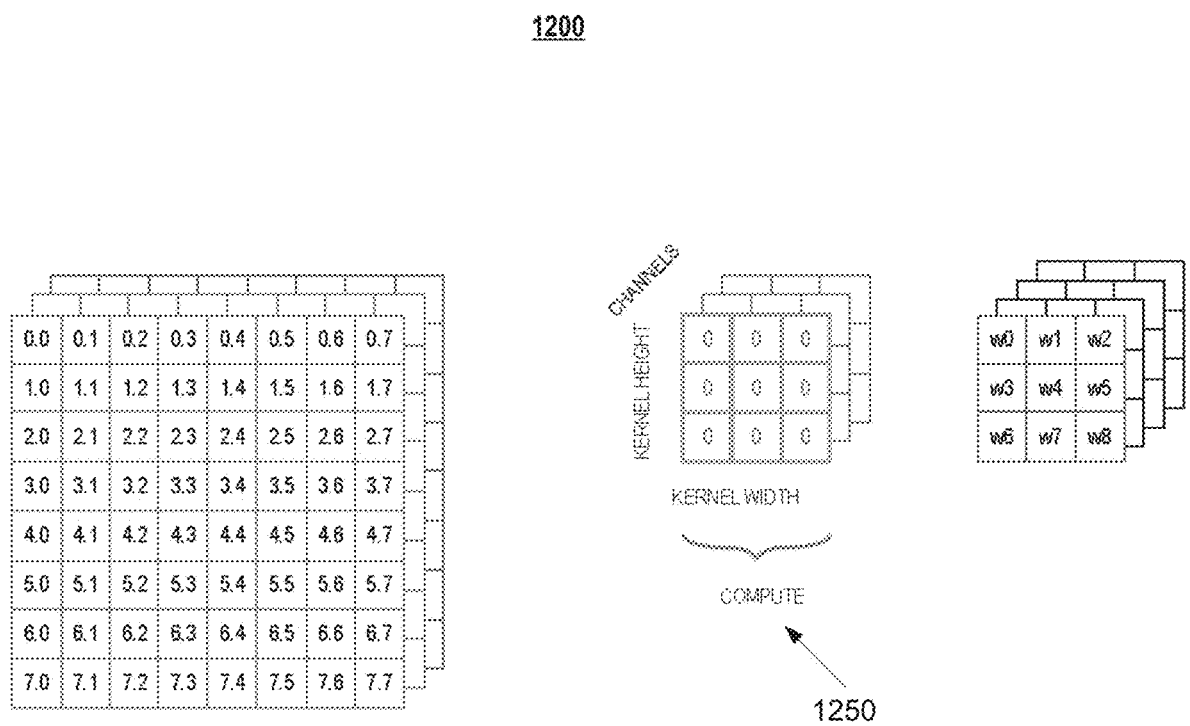
FIG. 12 illustrates a compute structure according to various embodiments of the present disclosure.
Figure 13:
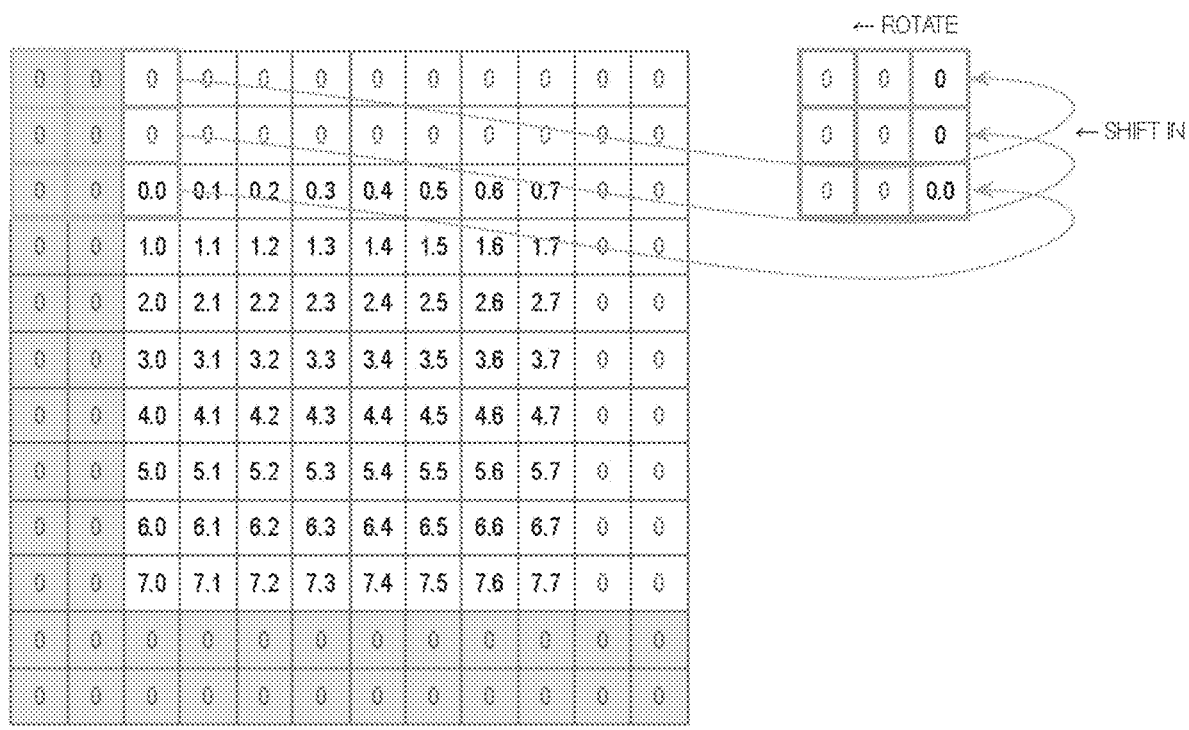
FIG. 13-FIG. 14 illustrate data shifting and rotation by a compute structure shown in FIG. 12.
Figure 14:
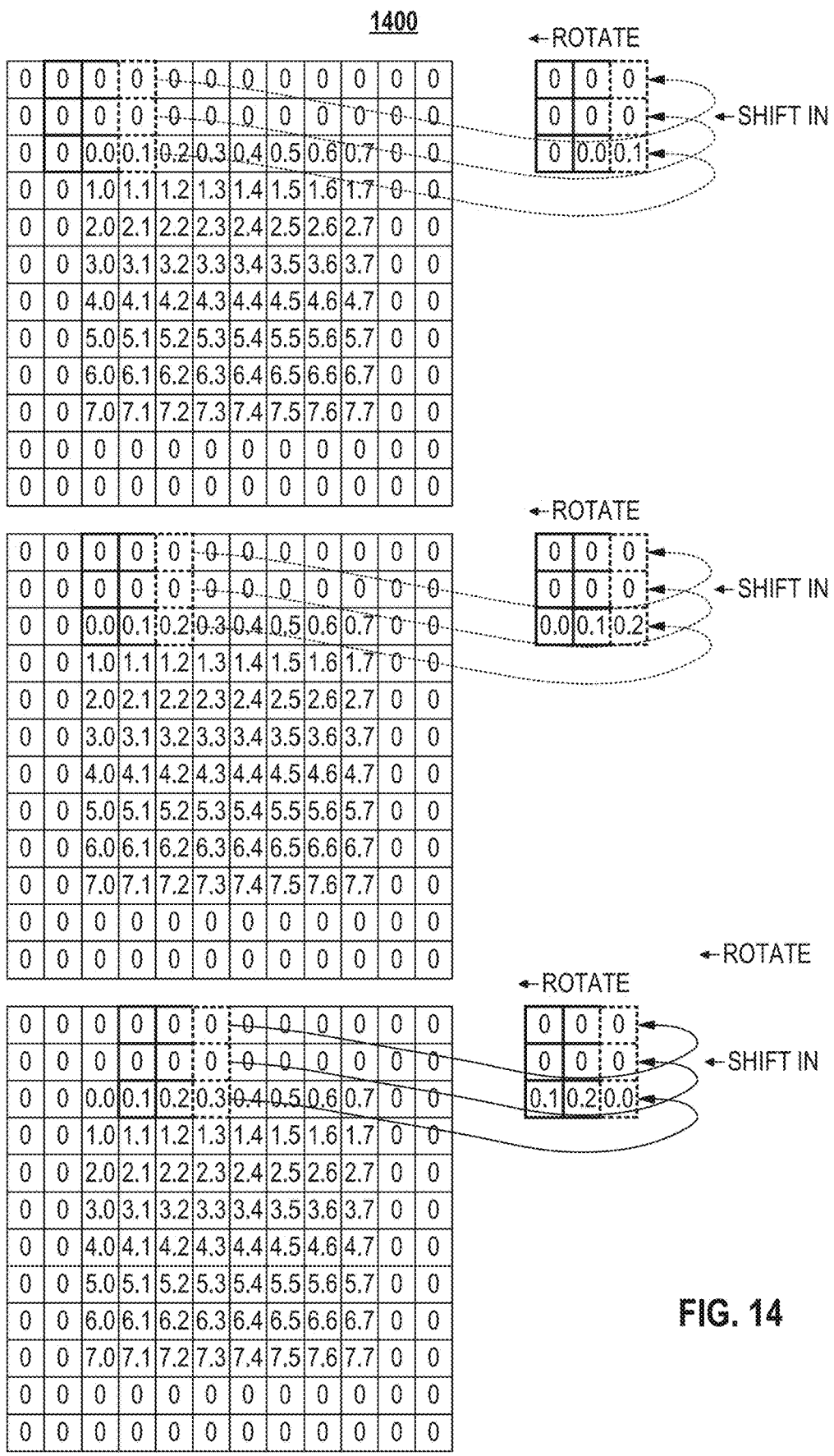

FIG. 12 illustrates compute structure 1250 that has no line buffers, according to various embodiments of the present disclosure. In scenarios in which energy and storage space requirements for caching a full line and repeatedly rotating may be unacceptably high, certain embodiments provide a tradeoff between repeatedly loading data and the reducing/eliminating storage space of the caching memory. FIG. 13-FIG. 14 illustrate data shifting and rotation by compute structure 1250 in FIG. 12.

Figure 15:
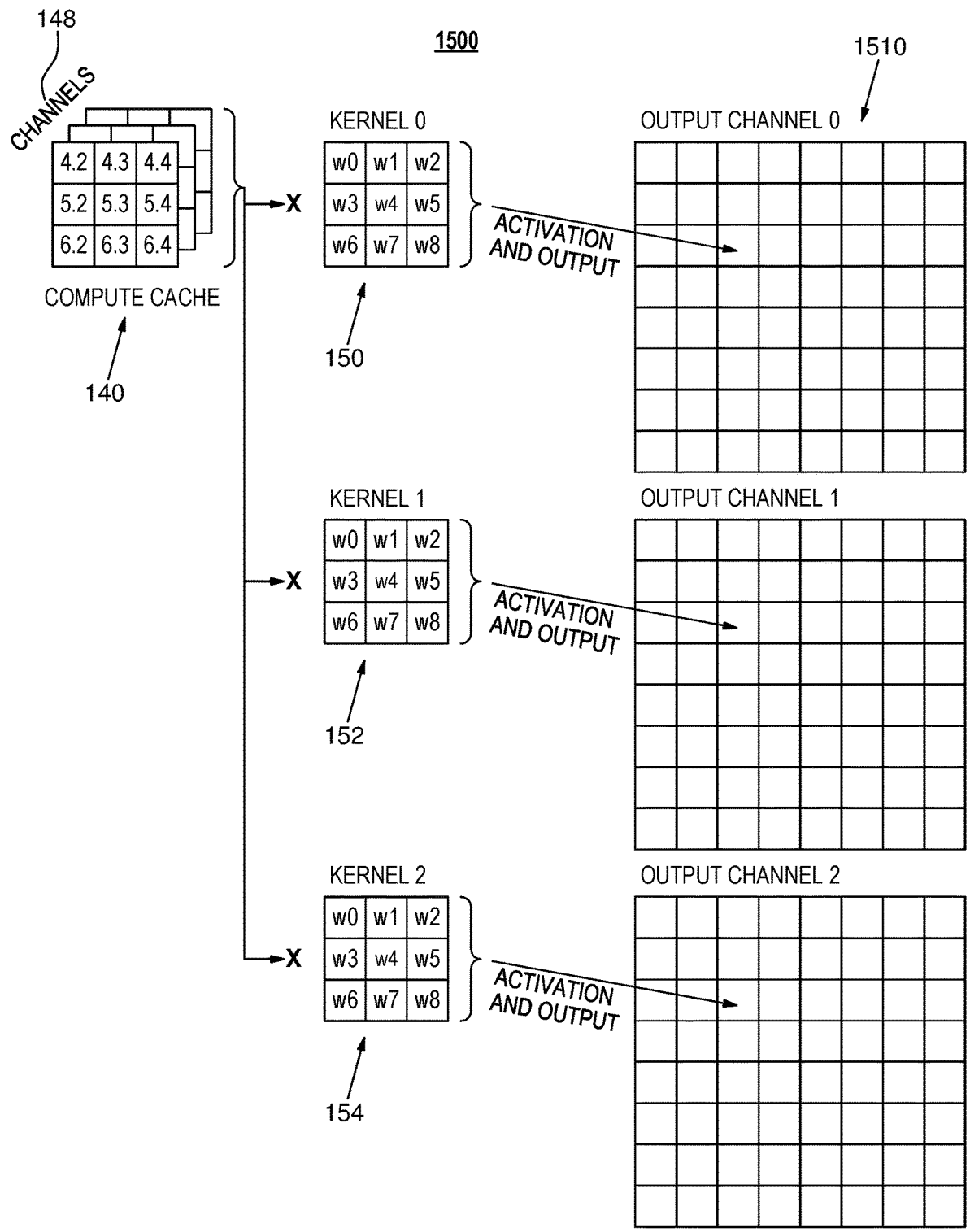
FIG. 15 illustrates a multi-channel multiplication using a compute structure, according to various embodiments of the present disclosure.

FIG. 15 illustrates a multi-channel multiplication using a compute structure, according to various embodiments of the present disclosure. Individual elements in compute structure 140 shown in FIG. 15 represent a 3×3 matrix. Similarly, elements in kernel 150 may represent a 3×3 matrix. In embodiments, the dimensions of compute cache 140 are chosen to match the dimensions of kernel 150, here a 3×3 structure. In embodiments, compute cache structure 140 is designed to properly shift and rotate to align the to-be-computed elements in a manner such as to enable the execution of an expected mathematical operation that generates an intended result.

In operation, weights in kernel 150-154 may be applied to the data in compute cache section 140 in a multiplication operation, e.g., to perform one set of multiplications per cycle. Once a set of data is loaded into compute cache section 140, the multiplication may be performed simultaneously for all three channels 148 in FIG. 15 to generate data for three output channels 1510. In embodiments, the data in compute structure 140 may be simultaneously accessed and processed in a predetermined order to perform, for a first of several input channels 148, a number of multiplication operations on one or more kernels 150-154. For example, a dot product that represents an output pixel of an image may be generated by dot-multiplying individual elements in compute structure 140 with individual elements in kernel 150 to obtain partial results that may then be added to obtain an aggregated dot product.

Unlike existing methods, the multiplication of individual elements, i.e., a scalar multiplication, need not be performed on individual data elements by breaking up the dot multiplication into a series of individual sub-operations. As a result, partial products need not be stored and fetched from some intermediate register, buffer, or cache to complete an arithmetic operation.

In embodiments, the elementwise rotation of positions in compute cache 140 matches the positions of the weights in kernel 150. The numbers in compute cache 140 may change from cycle to cycle within an ordered sequence of shift operations that result, e.g., in an element-by-element multiplication. Unlike the numbers in compute cache 140, the numbers in kernel 150 need not change from cycle to cycle within the ordered sequence of shift operations.

Therefore, in embodiments, while the elements in compute cache 140 are subject to rotate and shift operations, the elements in kernel 150 may remain the same for the duration of a multiplication operation. In other words, compute cache 140 may use the same kernel 150 to generate output data for different output channels 1510, such that, advantageously, the data in kernel 150 is reused, e.g., over a number cycles to execute a convolution operation.

In embodiments, an activation function (such as a non-linear ReLU function), may be applied to a computation, e.g., by a hardware or software controller. In embodiments, a CNN may use a pooling operation, e.g., after a convolution. Therefore, in addition to performing convolution operations, embodiments of the present disclosure may also be used to performing other operations, such as max pooling and average pooling. Pooling is a form of nonlinear sub-sampling or down-sampling that uses a nonlinear function, such as max-pooling or average-pooling, to reduce the amount of computations and increase throughput. Pooling generally involves sliding a pooling window, e.g., a two-dimensional square window stepwise across small, non-overlapping areas of an output of a preceding convolution. Aggregating the values of the group of data in the window provides single output values (e.g., integers) for each group in a local neighborhood.

Figure 16:
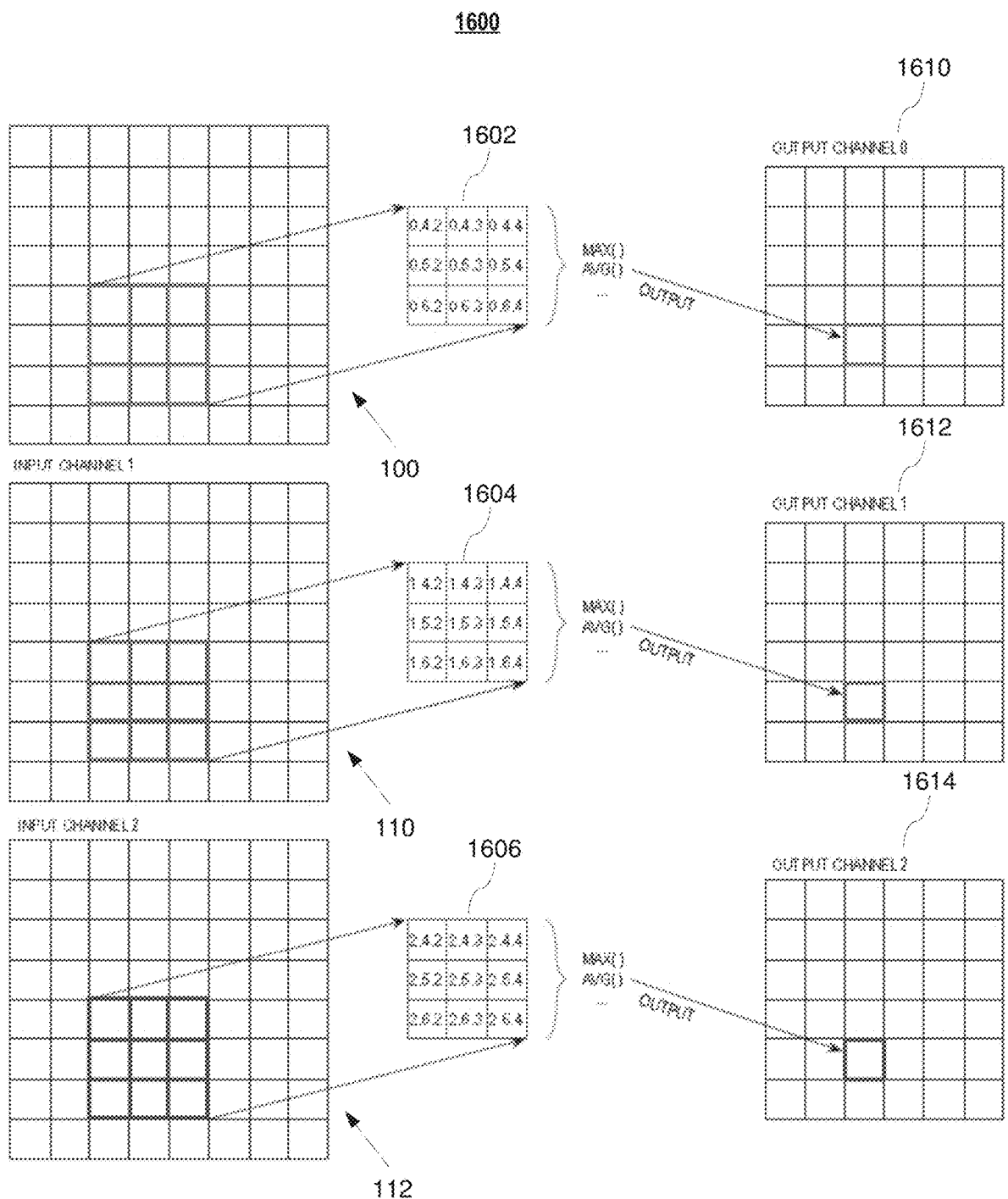
FIG. 16 illustrates multi-channel pooling using a compute structure according to various embodiments of the present disclosure.

FIG. 16 illustrates multi-channel pooling using a compute structure according to various embodiments of the present disclosure. In embodiments, a max-pooling operation selects the largest element in compute cache 1602, and average-pooling computes the average (mean) of the elements in compute cache 1602. The size and location of a pooling window depends on the pooling stride and may be determined by size of compute structure 1602, here, a 3×3 matrix. Once a set of data is loaded into compute cache 1602-1606, pooling may be performed simultaneously for all three input channels 100, 110, 112 to generate respective output channels 1610-1614. It is noted that unlike a convolution, pooling operates independently on depth slices of the input. Differently stated, the number of input channels and the number of output channels are identical, and the mathematical operation does not mix data from multiple input channels.

Figure 17:
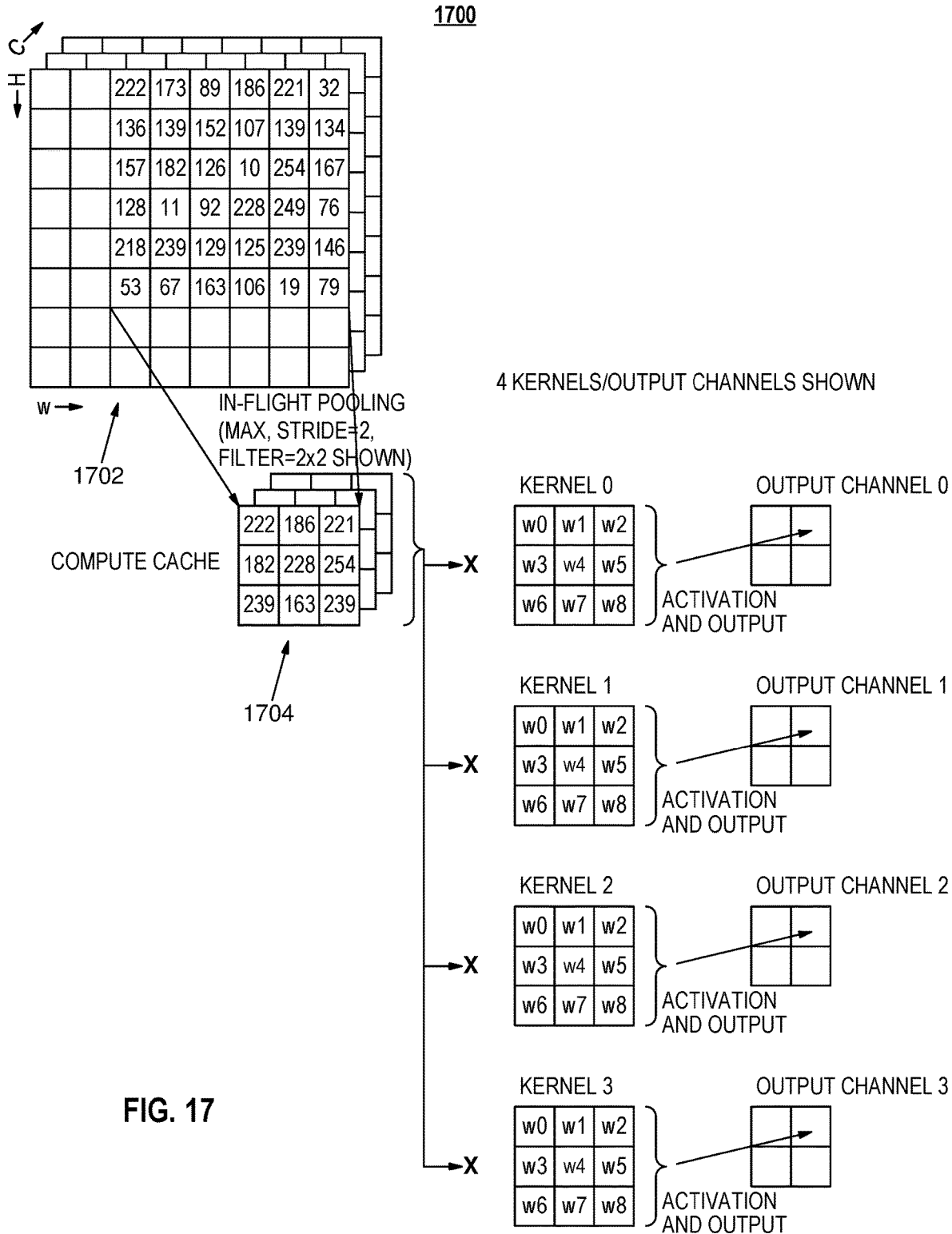
FIG. 17 illustrates an alternative max-pooling process according to various embodiments of the present disclosure.

FIG. 17 illustrates an alternative max-pooling process according to various embodiments of the present disclosure. In embodiments, compute cache 1704 is a special purpose compute cache 1704 that is introduced into the data path to perform max-pooling operations on two or more pooling windows in a given region of source memory 1702.

As shown in FIG. 17, pooling data from a pooling window (e.g., the window comprising numbers 222, 173, 136, and 139) delivers a 2×2 max-pooling result (here, the number 222) that, in effect, reduces the amount of computations for a subsequent layer in a neural network, here, a convolution that is performed as previously described with respect to FIG. 15.

The pooling process in FIG. 17 may be described as "in-flight" pooling, i.e., pooling occurs when the original data is read out from source memory 1702 before the pooled data are written into compute cache 1704. For example, in embodiments, data in a pooling window may be max-pooled by streaming the data element-by-element and replacing one element value with the value of a subsequent element in the data stream if the subsequent value is a greater (and otherwise ignoring it). In this manner, the pooling operation does not rely on intermediate storage or caching steps.

In embodiments, pooling operations may be implemented in hardware to eliminate unnecessary data movement. This reduces computing time and power consumption, especially, when compared to existing power-hungry software approaches that operate on standard hardware and undergo a series of operations along a data path to accomplish pooling.

It is understood that any portion of the pooling computations may be performed in parallel, e.g., by using a number of pooling engines, e.g., pooling engines that themselves may perform series operations. It is noted that embodiments herein are not limited to any particular kernel size, filter size, or pooling type, and may apply to other computations that may operate on input depth slices independently.

Embodiments discussed above may be relatively easily implemented using a set of hierarchical memory comprising readily available commodity memory and a caching and compute structure as shown, e.g., in FIG. 1 and FIG. 12. In embodiments, to further increase energy efficiency, the compute structure may be integrated into a custom memory structure such as shown in FIG. 18.

Figure 18:
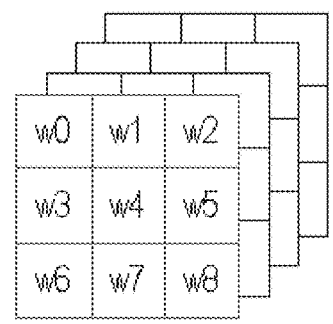
FIG. 18 and FIG. 19 illustrate a memory structure that comprises integrated compute hardware, according to various embodiments of the present disclosure.
Figure 18:

FIG. 18 illustrates a memory structure that comprises integrated compute hardware, according to various embodiments of the present disclosure. The compute hardware may be directly integrated into "source" memory 1802, such that source data may be processed in-place, e.g., in memory 1802. As a result, data need not be moved out of memory 1802, advantageously, further reducing data movement and power consumption. It is noted that memory 1802 may be implemented by utilizing several data paths as parallel physical paths, time sequenced paths, or as a combination thereof. For example, FIG. 18 memory 1802 may be implemented as a RAM cell structure that, in embodiments, allows access to a block of data without requiring multiple access steps.

Figure 19:
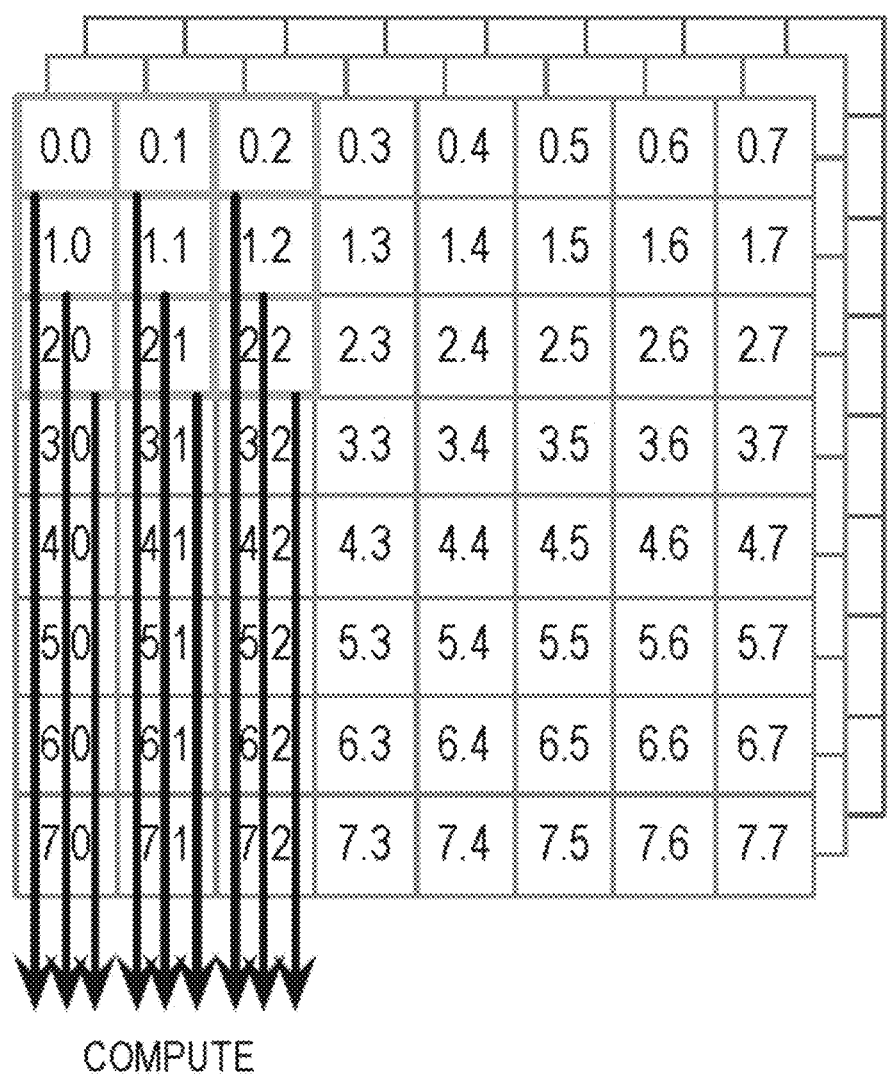

In detail, memory 1802 may be hardwired in a manner such that the connectivity enables memory 1802 to act as a compute structure to perform functions similar to those of compute structure 140 in FIG. 1 and cache section 130. Thus, memory 1802 in FIG. 18 eliminates some of the functions that otherwise, e.g., a cache would need to perform. For example, a multiplication operation may be performed within memory 1802 itself. In embodiments, this is enabled by (simultaneously) accessing within memory 1802 a block of data, which defines an area spanning a sub-set of columns and rows of memory 1802, based on a single address key that identifies the location of the block of data in memory 1802, instead of line-by-line reading and extracting the data in a serial manner. The accessed block of data is used as a compute structure that, e.g., in combination with logic components that may be located in close proximity to the physical memory, perform arithmetic operations. In embodiments, as indicated in FIG. 19, processing may be performed at the bottom of a memory array. Once the memory structure completes a computation, the result may be written into, e.g., a register (not shown).

Figure 20:
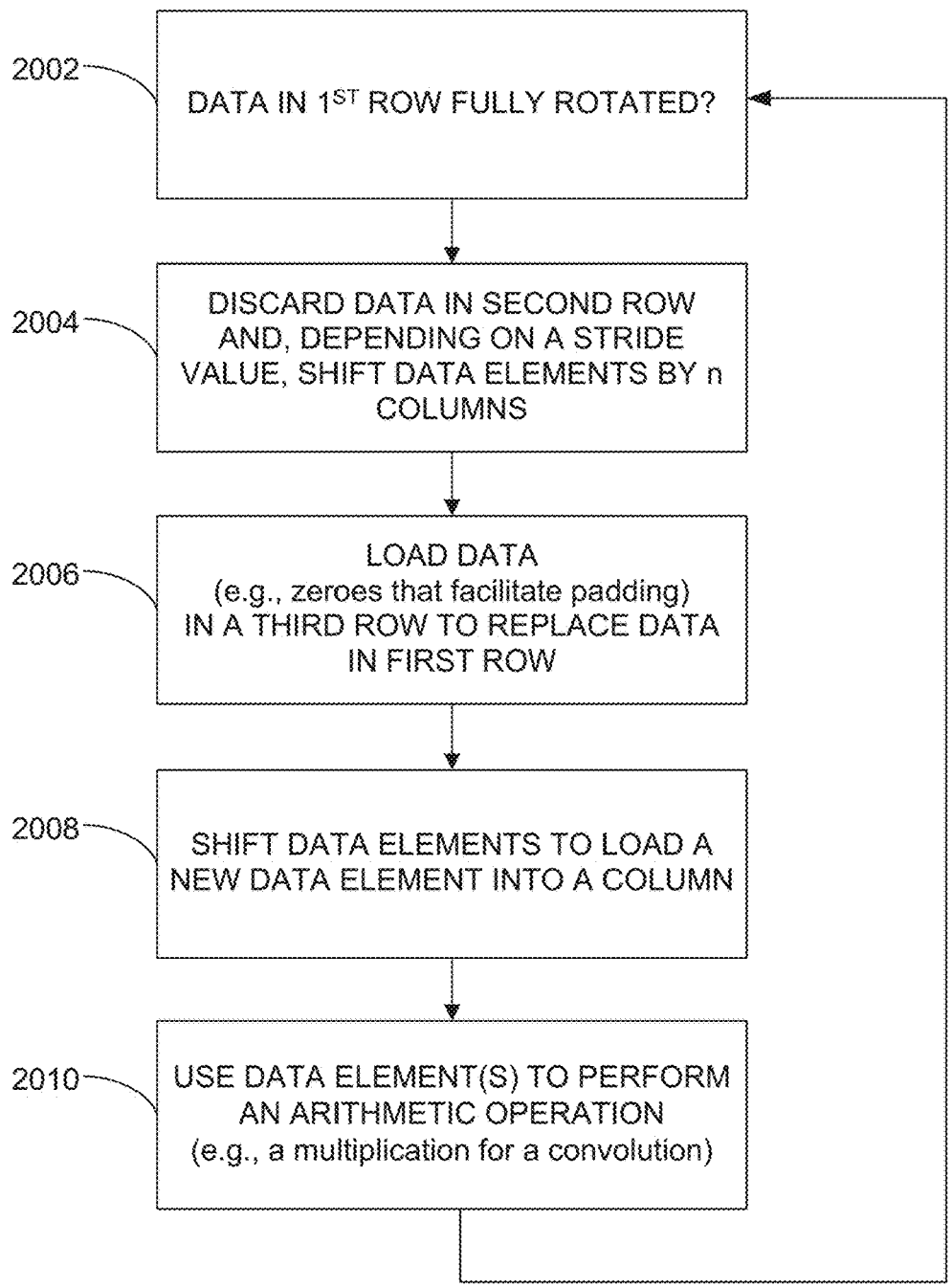
FIG. 20 is a flowchart of an illustrative process for using a compute structure to perform calculations according to various embodiments of the present disclosure.

FIG. 20 is a flowchart of an illustrative process for using a compute structure to perform calculations according to various embodiments of the present disclosure. Process 2000 for using the compute structure starts at step 2002, when it is decided whether data in a first row located at a first end of a computing structure has undergone a full rotation cycle in the direction of a second end of the computing structure. The computing structure may represent a two-dimensional data matrix.

At step 2004, in response to determining that the data in the first row has been so rotated, data in a second row located at a third end of the computing structure may be discarded, and the data elements in the computing structure may be shifted towards the third end, e.g., by a number, n, of elements or columns to enable a stride in a convolution operation.

At step 2006, at the first end, data in a third row may be loaded into the computing structure in order to replace the data in the first row. In embodiments, the third row may be a row of zeroes that facilitate padding.

At step 2008, the data elements in the computing structure may be shifted towards the second end, such that a new data element may be loaded into the computing structure at a fourth end, e.g., from a bottom right corner of the computing structure. The new data element may be read, for example, from an independent memory.

At step 2010, some or all data elements in the computing structure may be used to perform an arithmetic operation, e.g., a multiplication for a convolution.

Finally, at step 2012, process 2000 may return to step 2002 to resume with checking whether the data in the first row has been fully rotated again, e.g., until a stop condition has been reached.

Figure 21:
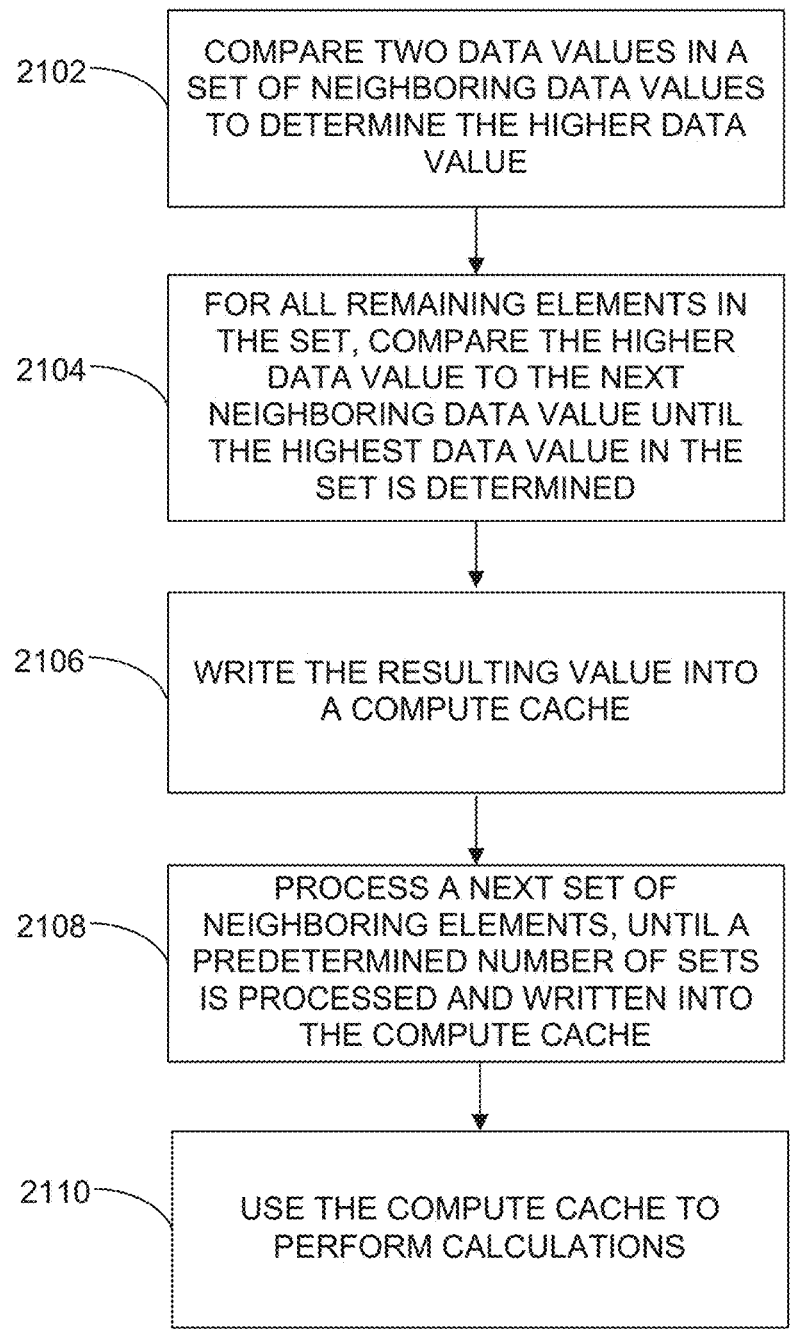
FIG. 21 is a flowchart of an illustrative process for using a compute structure to perform in-flight pooling according to various embodiments of the present disclosure.

FIG. 21 is a flowchart of an illustrative process for using a compute structure to perform in-flight pooling according to various embodiments of the present disclosure. Process 2100 for in-flight pooling starts at step 2100, when a circuit, e.g., logic circuit located within a memory, processes a section of data that corresponds to a set of neighboring data elements (e.g., neighboring data elements in a matrix) by sequentially comparing a value of one element to the next element to determine the higher of the two values.

At step 2004, the higher value may then be compared to the next element until all elements in the set of neighboring data elements are processed.

At step 2006, the resulting value may be written into a compute cache.

At step 2008, second set of neighboring elements is processed.

At step 2010, the result of the second set may be written into the compute cache until a predetermined number of sets is processed and written into the compute cache.

At step 2012, compute cache may be used to perform calculations. One skilled in the art shall recognize that: (1) certain steps may optionally be performed; (2) steps may not be limited to the specific order set forth herein; (3) certain steps may be performed in different orders; and (4) certain steps may be done concurrently.

Figure 22:
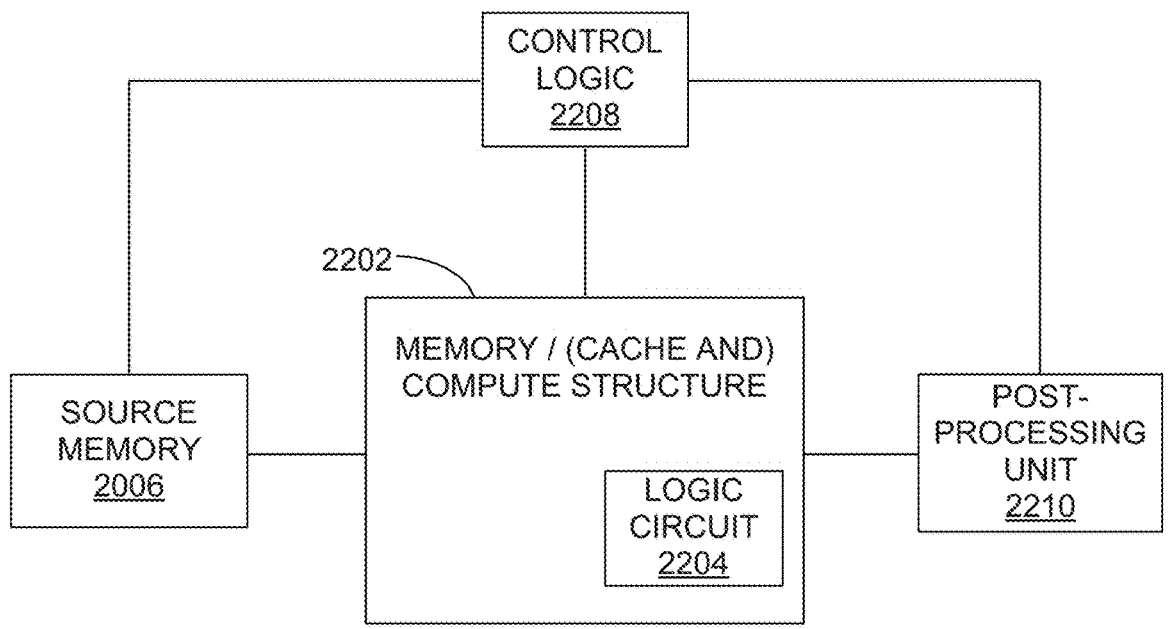
FIG. 22 illustrates an exemplary system utilizing a cache and compute structure according to various embodiments of the present disclosure.

Aspects of the present invention may be implemented using alternate means, e.g., by using CPU instructions, ASIC(s), programmable arrays, digital signal processing circuitry, and the like. FIG. 22 illustrates an exemplary system utilizing a cache and compute structure according to various embodiments of the present disclosure. System 2200 comprises memory 2202 that comprises logic circuit 2204; source memory 2006; control logic 2208; and post-processing unit 2210. A description of the functions of the individual components and their interaction has been described in detail above and, for purposes of brevity, is not repeated here.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A compute system for performing arithmetic calculations, the compute system comprising:
a source memory that stores source data for an arithmetic operation;
a compute cache to cache some of the source data;
a compute memory coupled to the compute cache, the compute memory being used in one or more cycles of the arithmetic operation, the compute cache and the compute memory forming a computing structure;
a weight memory coupled to the compute memory, the weight memory stores weight data for use in the arithmetic operation; and
a controller coupled to the computing structure, the controller performs steps comprising:
in response to data in a first row located at a first end of the computing structure having undergone a full rotation cycle in a direction of a second end of the computing structure, discarding data in a second row located at a third end of the computing structure;
shifting data elements in the computing structure towards the third end;
at the first end, loading data from a third row into the computing structure to replace the data in the first row;
shifting the data elements in the computing structure towards the second end, such that a new data element is loaded into the computing structure at a fourth end; and
using two or more data elements in the computing structure to perform the arithmetic operation.

2. The compute system according to claim 1, wherein the compute cache is implemented as a RAM cell structure that enables data access without requiring a plurality of access steps.

3. The compute system according to claim 1, wherein the compute memory comprises a register-based hardware structure and the controller comprises a state machine.

4. The compute system according to claim 1, wherein the compute cache is larger than the compute memory.

5. The compute system according to claim 1, wherein the source memory has a width that is equal or less than the computing structure.

6. The compute system according to claim 1, wherein shifting the data elements comprises shifting by a number N of elements to enable a stride in a convolution operation.

7. A method for using a compute structure that comprises a controller to perform calculations, the method comprising:
in response to data in a first row located at a first end of a computing structure having undergone a full rotation cycle in a direction of a second end of the computing structure, performing by the controller:
discarding data in a second row located at a third end of the computing structure;
shifting data elements in the computing structure towards the third end;
at the first end, loading data from a third row into the computing structure to replace the data in the first row;
shifting the data elements in the computing structure towards the second end, such that a new data element is loaded into the computing structure at a fourth end; and
using two or more data elements in the computing structure to perform an arithmetic operation, wherein the compute structure comprises:
a source memory that stores source data for the arithmetic operation;
a compute cache to cache some of the source data;
a compute memory coupled to the compute cache, the compute memory being used in one or more cycles of the arithmetic operation, the compute cache and the compute memory forming a computing structure; and
a weight memory coupled to the compute memory, the weight memory stores weight data for use in the arithmetic operation.

8. The method according to claim 7, wherein the computing structure comprises a register-based hardware structure and the controller comprises a state machine.

9. The method according to claim 7, wherein the computing structure represents a two dimensional data matrix.

10. The method according to claim 7, further comprising, in subsequent cycles of a convolution operation, applying elements in a kernel to elements in the computing structure to obtain partial dot-products without performing scalar operations.

11. The method according to claim 7, wherein shifting the data elements comprises shifting by a number N of elements to enable a stride in a convolution operation.

12. The method according to claim 7, wherein the new data element is read from an independent memory.

13. The method according to claim 12, wherein the independent memory has a width that is equal or less than the computing structure.

* * * * *